(12) United States Patent  
Fritz et al.

(10) Patent No.: US 10,611,408 B2  
(45) Date of Patent: Apr. 7, 2020

(54) VEHICLE BODY FOR AN ELECTRICALLY DRIVEN VEHICLE

(71) Applicant: Dr. Ing. h.c. F. Porsche Aktiengesellschaft, Stuttgart (DE)

(72) Inventors: Thomas Fritz, Löchgau (DE); Arik Rathner, Stuttgart (DE); Otmar Bitsche, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/825,587

(22) Filed: Nov. 29, 2017

(65) Prior Publication Data

US 2018/0154940 A1   Jun. 7, 2018

(30) Foreign Application Priority Data

Dec. 6, 2016   (DE) .................. 10 2016 123 553

(51) Int. Cl.
| | |
|---|---|
| *B60K 1/04* | (2019.01) |
| *B60L 53/80* | (2019.01) |
| *B62D 21/02* | (2006.01) |
| *B62D 21/09* | (2006.01) |
| *B62D 25/20* | (2006.01) |

(52) U.S. Cl.
CPC ............ *B62D 21/02* (2013.01); *B62D 21/09* (2013.01); *B62D 25/2009* (2013.01); *B60K 2001/0438* (2013.01); *B60K 2001/0472* (2013.01)

(58) Field of Classification Search
CPC .............. B60K 1/04; B60K 2001/0405; B60K 2001/0422; B60K 2001/0427; B60K 2001/0433; B60K 2001/0438; B60K 2001/0411; B60K 2001/0416; B60K 2001/0455; B60K 2001/0461; B60K 2001/0466; B60K 2001/0472;
(Continued)

(56) References Cited

U.S. PATENT DOCUMENTS

| | | | |
|---|---|---|---|
| 4,087,895 A * | 5/1978 | Etienne .................. | B60K 1/04 254/93 HP |
| 4,397,365 A * | 8/1983 | Harbe ...................... | B60K 1/04 104/34 |

(Continued)

FOREIGN PATENT DOCUMENTS

| | | | |
|---|---|---|---|
| DE | 2241548 B1 | 10/1973 | |
| GB | 1377729 A * | 12/1974 | ............... B60K 1/04 |

(Continued)

OTHER PUBLICATIONS

German Search Report for German Application No. 10 2016 123 553.9. dated Oct. 2, 2017, with partial English translation—8 Pages.

(Continued)

*Primary Examiner* — James A Shriver, II  
*Assistant Examiner* — Vaughn Coolman  
(74) *Attorney, Agent, or Firm* — RatnerPrestia (57) ABSTRACT

A vehicle body for an electrically driven vehicle, having a vehicle frame for transmitting mechanical forces during the operation of the vehicle. The vehicle frame has a battery portion for receiving at least two battery modules, and the battery portion has at least one fastening interface for fastening the at least two battery modules in the received position.

6 Claims, 5 Drawing Sheets

(58) Field of Classification Search
CPC .... B60K 2001/0477; B60K 2001/0483; B60K 2001/0494; B60L 11/1822; H01M 2/1083
See application file for complete search history.

(56) References Cited

U.S. PATENT DOCUMENTS

| | | | | |
|---|---|---|---|---|
| 5,301,765 | A * | 4/1994 | Swanson | B60K 1/04 104/34 |
| 5,373,910 | A * | 12/1994 | Nixon | B60K 1/04 104/34 |
| 5,585,205 | A * | 12/1996 | Kohchi | B60K 1/04 180/65.1 |
| 5,998,963 | A * | 12/1999 | Aarseth | B60K 1/04 104/34 |
| 6,991,051 | B2 * | 1/2006 | Swindell | B60L 8/00 180/65.1 |
| 8,006,793 | B2 * | 8/2011 | Heichal | B60K 1/04 180/65.1 |
| 8,237,403 | B2 | 8/2012 | Ishii | |
| 9,033,078 | B2 | 5/2015 | Fillion et al. | |
| 9,070,923 | B2 * | 6/2015 | Yu | B60S 5/06 |
| 9,260,080 | B2 * | 2/2016 | Maguire | B60R 25/40 |
| 9,321,433 | B2 * | 4/2016 | Yin | B60L 11/1801 |
| 9,407,024 | B2 * | 8/2016 | Wu | H01R 13/11 |
| 9,566,954 | B2 * | 2/2017 | Moskowitz | B60K 1/04 |
| 9,630,483 | B2 * | 4/2017 | Yamada | B60K 1/04 |
| 9,722,223 | B1 * | 8/2017 | Maguire | H01M 2/1083 |
| 9,834,183 | B2 * | 12/2017 | Moskowitz | B60K 1/04 |
| 2005/0274556 | A1 * | 12/2005 | Chaney | B60K 1/04 180/68.5 |
| 2008/0294283 | A1 * | 11/2008 | Ligrano | B60S 5/06 700/218 |
| 2010/0071979 | A1 | 3/2010 | Heichal et al. | |
| 2010/0181129 | A1 * | 7/2010 | Hamidi | B60K 1/04 180/68.5 |
| 2012/0125702 | A1 | 5/2012 | Bergfjord | |
| 2012/0160584 | A1 * | 6/2012 | Nitawaki | B60K 1/04 180/68.5 |
| 2012/0247851 | A1 * | 10/2012 | Ichikawa | B60L 11/1822 180/68.5 |
| 2012/0263988 | A1 * | 10/2012 | Obasih | H01M 10/6556 429/98 |
| 2013/0037337 | A1 * | 2/2013 | Auer | B60K 1/04 180/68.5 |
| 2013/0075173 | A1 * | 3/2013 | Kato | B60K 1/04 180/68.5 |
| 2013/0156533 | A1 * | 6/2013 | Yu | H01M 2/1005 414/729 |
| 2013/0192913 | A1 * | 8/2013 | Joye | B60K 1/04 180/68.5 |
| 2013/0298586 | A1 * | 11/2013 | Hwang | B60K 1/04 62/239 |
| 2013/0343842 | A1 * | 12/2013 | Yu | B65G 1/137 414/273 |
| 2014/0060944 | A1 * | 3/2014 | Fillion | B60K 1/04 180/65.31 |
| 2014/0158444 | A1 * | 6/2014 | Han | B60K 1/04 180/68.5 |
| 2014/0165354 | A1 * | 6/2014 | Ojima | B60K 1/04 29/281.1 |
| 2014/0166381 | A1 * | 6/2014 | Ling | B60K 1/04 180/68.5 |
| 2014/0319907 | A1 * | 10/2014 | Yamazaki | B60K 1/04 307/9.1 |
| 2014/0353057 | A1 | 12/2014 | Adachi | |
| 2015/0107921 | A1 * | 4/2015 | Naruke | B62D 25/20 180/68.5 |
| 2016/0001748 | A1 * | 1/2016 | Moskowitz | B60K 1/04 701/22 |
| 2016/0009255 | A1 * | 1/2016 | Droste | B60L 11/1877 180/68.5 |
| 2016/0056482 | A1 * | 2/2016 | Otsuka | B60L 11/1898 180/220 |
| 2016/0104921 | A1 * | 4/2016 | Chorian | H01M 10/613 429/120 |
| 2016/0211560 | A1 | 7/2016 | Hara | |
| 2016/0276638 | A1 * | 9/2016 | Sham | B60K 1/04 |
| 2016/0285142 | A1 * | 9/2016 | Kimura | H01M 2/1077 |
| 2017/0113661 | A1 * | 4/2017 | Moskowitz | B60L 50/66 |
| 2017/0151882 | A1 * | 6/2017 | Lee | B60L 11/18 |
| 2017/0297541 | A1 * | 10/2017 | Droste | B60L 11/1822 |
| 2017/0334310 | A1 * | 11/2017 | Yokoyama | B60L 11/1877 |
| 2018/0118174 | A1 * | 5/2018 | Moskowitz | B60L 53/51 |
| 2018/0251102 | A1 * | 9/2018 | Han | B60S 5/06 |

FOREIGN PATENT DOCUMENTS

| | | |
|---|---|---|
| JP | 2014513858 A | 6/2014 |
| JP | 2016134243 A | 7/2016 |
| WO | 2008123543 A1 | 10/2008 |
| WO | 2012117173 A1 | 9/2012 |

OTHER PUBLICATIONS

Notification of Reason for Rejection of Japanese Application No. 2017-232410, dated Dec. 4, 2018, 4 pages.
Indian Examination Report for Indian Application No. 201714038854, dated Oct. 4, 2019, with translation, 7 pages.

* cited by examiner

VEHICLE BODY FOR AN ELECTRICALLY DRIVEN VEHICLE

CROSS-REFERENCE TO RELATED APPLICATION

This application claims priority to German Patent Application No. DE 10 2016 123 553.9, filed Dec. 6, 2016, the content of such application being incorporated by reference herein in its entirety.

FIELD OF THE INVENTION

The present invention relates to a vehicle body for an electrically driven vehicle, to a battery module for use in such a vehicle body, and a method for mounting a battery module in a vehicle body.

BACKGROUND OF THE INVENTION

It is known that battery modules are intended to be arranged in an electrically driven vehicle in order to supply an electric drive for the vehicle with the associated power. In the known solutions, individual battery modules are, for this purpose, received and premounted in an associated battery frame. The entire drive battery, which thus consists of the individual battery modifies and this battery frame, is then customarily inserted from below into the electrically driven vehicle on the assembly line for said vehicle.

A disadvantage with the known solutions is that a corresponding battery frame is necessary in order to ensure the necessary mechanical stability and the necessary mechanical protection for the individual battery modules. The separate mounting facilitates the assembly of the individual battery modules to form the drive battery. However, the use of the battery frame leads to additional weight having to be introduced into the electrically driven vehicle. Particularly in the case of electrically driven vehicles, the increase in weight results in the crucial disadvantage of reduced range and, accordingly, frequently reduced acceptance for potential buyers.

It would be desirable to achieve a weight ion in the region of the battery modules in an electrically driven vehicle.

SUMMARY OF THE INVENTION

Here, features and details which are described in conjunction with the vehicle body according to aspects of the invention of course also apply in conjunction with the battery module according to aspects of the invention and the method according to aspects of the invention, and vice versa in each case, so that reciprocal reference is or can always be made in respect of the disclosure pertaining to the individual aspects of the invention.

A vehicle body according to aspects of the invention for an electrically driven vehicle has a vehicle frame for transmitting mechanical forces during the operation of the vehicle. The vehicle frame is equipped with a battery portion for receiving at least two battery modules. Furthermore, the battery portion has at least one fastening interface for fastening the at least two battery modules in their received position.

For the purposes of the present invention, an electrically driven vehicle can be both a pure electric vehicle and a vehicle which has an electric auxiliary drive. Other combined solutions, such as so-called hybrid vehicles or electric vehicles having so-called range extenders, are also to be understood as electrically driven vehicles for the purposes of the present invention. A decisive core idea is that a drive battery which is composed of at least two battery modules is provided for the electric drive of the vehicle.

By contrast with the known solutions, the individual battery modules are thus no longer premounted, but inserted individually, sequentially or simultaneously into the corresponding vehicle frame of the vehicle body. This preferably occurs during the assembly of the vehicle in the corresponding assembly line.

For the purposes of the present invention, the vehicle frame is to be understood as meaning the body of the vehicle which can transmit the mechanical forces which occur during the operation of the vehicle. The vehicle frame thus serves as a vehicle structure for mounting the mechanical components situated thereon.

These include in particular the movable parts of the drive tram and the wheel carriers for fastening the individual wheels. In this case, the transmission of the mechanical forces by the vehicle frame also particularly includes mechanical forces which can be introduced into the vehicle body in a crash situation.

A core idea is thus that part of this vehicle frame is now a battery portion, in other words, beside the primary functionality of transmitting the mechanical forces, the vehicle frame is equipped with an additional secondary functionality. This is the functionality of receiving the battery modules. By contrast with the known solutions, a separate battery frame is thus no longer necessary, since, rather, the vehicle frame itself has a corresponding battery portion for the function of receiving the individual battery modules.

In this case, the battery portion can be configured in particular such that it is accessible from below the vehicle. Thus, the corresponding insertion movement of the individual battery modules can be carried out from below on an assembly line. Vehicles are frequently moved on assembly lines by means of conveyer belts at different heights and different positions. Here, either insertion from below can be made available or else rotation of the entire vehicle body in order to insert the individual battery modules from the side or from above. In this case, the insertion of the battery modules can be effected either manually, that is to say by the hand of an operator, or robotically or partially robotically. Particularly when using robotically guided insertion movements, the disadvantages which possibly arise through the loss of external premounting are substantially completely eliminated.

As can be recognized from the above description, a separate battery frame now becomes obsolete. Rather, it is possible, through the union of functions, for the vehicle frame to take over the corresponding receiving functionality of the hitherto necessary battery frame, with the result that both the space requirement and the necessary weight for the battery frame is completely dispensed with when using a vehicle body according to aspects of the invention. A vehicle body having the configuration essential to the invention thus leads to a more lightweight design form of the entire electrically driven vehicle and thus to the possibility of achieving a greater range with the same available battery power. The further vehicle performance levels, such as acceleration behavior nd maximum speed, are also considerably improved by the reduced weight for the electrically driven vehicle.

What is to be understood by the received position is the position for the respective battery module in which the battery module is inserted and in which the battery module is fastened. Thus, the battery module remains in the fastened, received position over the lifetime of the battery module or over the lifetime of the driven, vehicle. The contacting of the individual battery modules with one another or with the corresponding drive trains within the vehicle can in this case be effected either manually or automatically or partially automatically. Particularly when using the contact portions explained below, an automatic or partially automatic contacting of the individual battery modules with one another is conceivable for the purposes of the present invention. Here, contact portions or contact lines can be provided within the battery portion in order to be able to make available the corresponding cross-contacting for completing the contacting between the individual battery modules.

Here, the fastening by means of the fastening interface can be designed in various ways. Thus, there can be both reversible and irreversible fastenings. It is also conceivable for a prefastening or final fastening to be effected as it were automatically when the battery module has arrived in the received position. This functionality can be achieved for example by snap/latching fastenings.

It can be advantageous if, in a vehicle body according to aspects of the invention, s the battery portion has, for each battery module to be received, two contact portions for electrically contacting mating contact portions of the respective battery module in the received position. The battery modules are customarily, equipped with a plus and minus polarity. In order to correspondingly electrically contact these two different poles, in each case two contact portions are arranged on the battery portion for each battery module to be received. The corresponding mating contact portions accordingly have the same number. However, other set-ups are of course also conceivable in principle, with the result that it is also possible for core than two contact portions to be contacted with correspondingly more than two mating contact portions. In order to continue the contacting within the battery portion of the vehicle frame, electrical lines can be provided which interconnect the individual contact portions for different battery modules in the desired set-up. Here, the contact portions and the mating contact portions have in particular complementary shapes, with the result that a corresponding positive and/or partially positive inter-engagement is possible. Thus pins, depressions or grooves can be provided for example in order to be able to make available such a configuration of the contact portions or the mating contact portions.

A further advantage is achievable, if, in a vehicle, body according to aspects of the invention, the contact portions have guide surfaces for orienting the respective battery module relative to the battery portion during insertion into the received position. Such guide surfaces can be made available for example by guide bevels or a guide cone. They, make it easier to find the desired relative position particularly during automatic or partially automatic mounting. The necessary accuracy when inserting the battery modules in the direction of the received position is accordingly reduced, with the result that it is usually possible to operate at higher mounting speeds. Thus, for example, a robot can carry out a corresponding prepositioning of the battery module below the battery portion, with the result that finally, the insertion operation allows a certain play in order to guide the battery module with the aid of the guide surfaces exactly into the desired relative position into the received position relative to the battery portion.

It is a further advantage if, in a vehicle body according to aspects of the invention, the battery portion has, for, each battery module to be received, a fluid portion for forming a fluid-communicating connection to a mating fluid portion of the respective battery module in the received position. Similarly to what has already been explained with respect to the electrical contactings of the contact portions, battery modules are frequently equipped with individual cooling devices. As will be explained below, battery modules according to aspects of the invention can each separately have their own coding devices, with the result that the cooling functionality is already part of the battery modules. In order thus to combine the cooling functionality of the individual cooling devices to form an overall cooling circuit, the fluid portions and the mating fluid portions are provided in this embodiment. When inserting the battery module into the received position, there thus results a fluid-communicating connection between the cooling device of the battery module on the one hand and a corresponding further cooling circuit of the battery portion in the vehicle body on the other hand. Here, the filling operation can be carried out after mounting or at least partially even before mounting in order to obtain the corresponding coolant or the cooling liquid in situ. A filled mounting is possible in particular when mounting valves are provided on the battery modules or on the fluid portions of the battery portion. Similarly to what has been explained for the electrical contacting, the cooling circuit is thus also formed as it were automatically during mounting.

It can be further advantageous if, in a vehicle body according to aspects of the invention, the fluid portions have guide surfaces for orienting the respective battery module relative to the battery portion during insertion into the received position. These guide surfaces can have a similar or even identical design to correspond to, what has already been explained with respect to the guide surfaces of the contact portions. Here, these guide surfaces correlate for example valves as can be formed on the fluid portion or on the mating fluid portion.

It is a further advantage if, in a vehicle body according to aspects of the invention, the contact portions and/or the fluid portions have or has an insertion direction which is oriented along or substantially along the mounting direction of the respective battery module into the battery portion into the received position. Particularly with reference to the fastening interface, there is a defined mounting direction in order to move the battery module into its received position. This mounting direction can also have a mounting corridor. The associated insertion direction of the contact portion or of the fluid portion refers to the direction which the battery module must follow in terms of movement in order to produce the desired electrical contacting and/or the desired formation of the fluid-communicating communication. The correlation of the insertion directions with the mounting direction in a manner according to aspects of the invention thus means that the electrical contacting and/or the fluid-communicating contacting are or is as it were automatically accompanied by the fastening of the battery module. Thus, when inserting the battery module, both the electrical contacting and the fluid-communicating contacting are carried out as it were automatically and simultaneously.

A further subject of the present invention is a battery module for use in a vehicle body according to the present invention. Such a battery module has a mating fastening interface for fastening to the fastening interface of the battery portion of the vehicle frame. Consequently, a battery module according to aspects of the invention provides the same advantages as have been explained extensively with reference to a vehicle body according to aspects of the invention. Of course, another subject of the present invention is a system consisting of a vehicle body according to aspects of the invention on the one hand, and, inserted therein, at least two battery modules according to aspects of the invention on the other hand.

A battery module according to the present invention can be developed such that there are provided at least two mating contact portions for electrically contacting contact portions of the battery portion and/or at least two mating fluid portions for a fluid-communicating connection to fluid portions of the battery portion. Here, the contacting can occur either manually or automatically or partially automatically. The associated mating contact portions or mating fluid portions provide the corresponding advantages as have already been explained with reference to the contact portions and the fluid portions.

Moreover, it is advantageous if, in a battery module according to aspects of the invention, a cooling device is provided, in particular laterally on the battery module. This cooling device is accordingly part of the battery module, with the result that a subsequent installation necessity for a cooling device on already mounted battery modules is no longer necessary. Rather, the battery modules are as it were prefabricated with the individual cooling devices, and in particular equipped with the mating fluid portions already explained. Accordingly, when inserting the battery modules into the received position, the cooling circuit is concomitantly formed as it were automatically and simultaneously. Here, the cooling device preferably comprises internal battery cells of the respective battery module in order to be able to make available the corresponding heat dissipation functionality.

A further subject of the present invention is a method for mounting a battery module according to aspects of the invention in a vehicle body according to aspects of the invention, comprising the following steps:
    inserting at least two battery modules into a battery portion of the vehicle frame; and
    fastening the at least two battery modules to the fastening interfaces of the battery portion in the received position.

Inserting the two battery modules according to aspects of the invention and producing a system consisting of battery modules according to aspects of the invention and vehicle body according to aspects of the invention affords the same advantages as have been explained extensively with reference to the battery module according to aspects of the invention or with reference to the vehicle body according to aspects of the invention. Here, the step of insertion can be carried out either simultaneously for the individual battery modules or else sequentially or partially sequentially. The contacting in an electrical and/or fluid-communicating manner can be carried out both automatically or partially automatically and, in a conventional manner, manually. Here, the cooling fluid used can be in particular cooling liquids.

BRIEF DESCRIPTION OF THE DRAWINGS

Further advantages, features and details of the invention gill emerge from the following description, in which exemplary embodiments of the invention are described in detail with reference to the drawings. In the drawings, schematically.

DETAILED DESCRIPTION OF THE INVENTION

Figure 1:
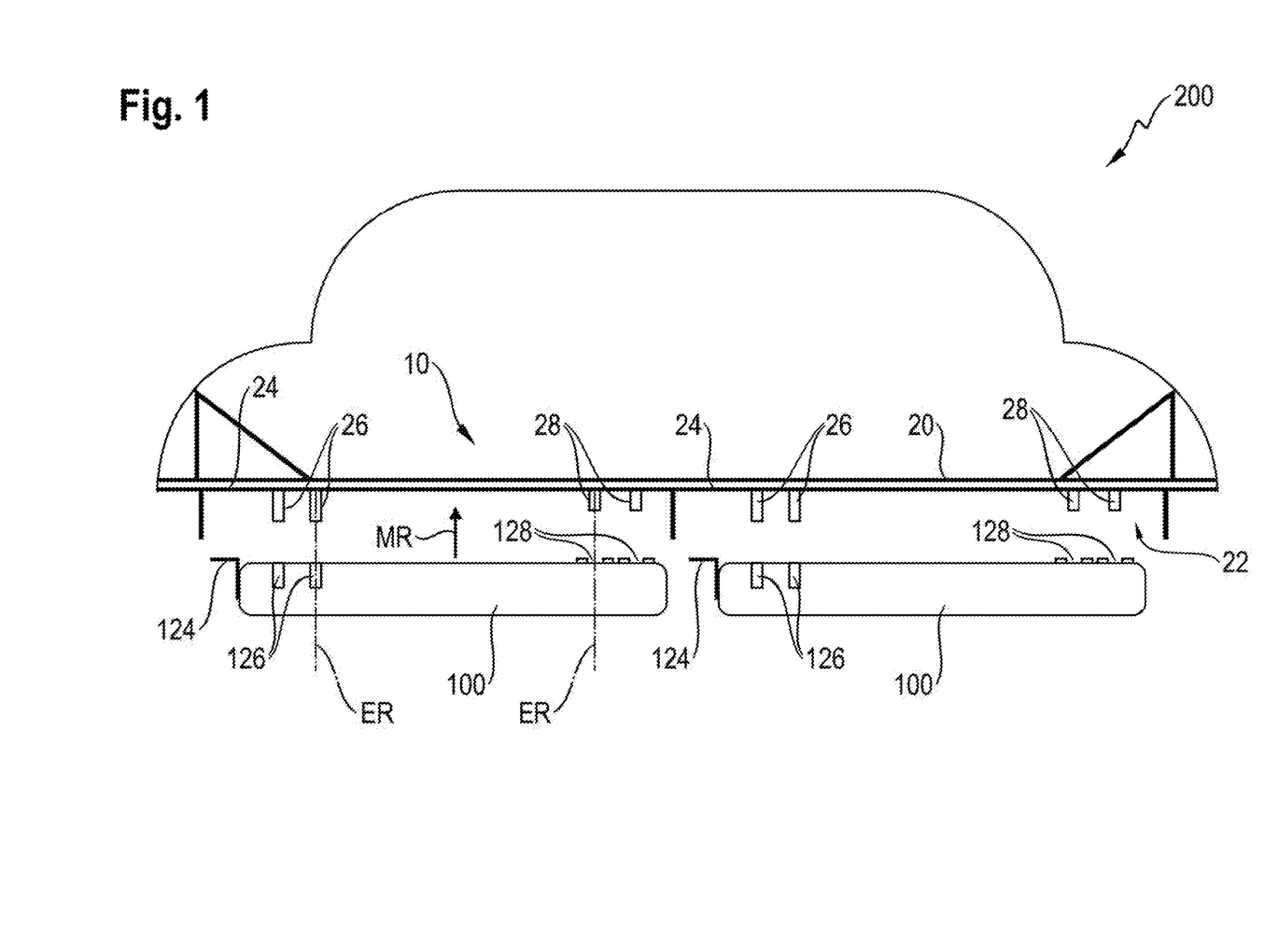
FIG. 1 shows an embodiment of vehicle body according to aspects of the invention.
Figure 2:
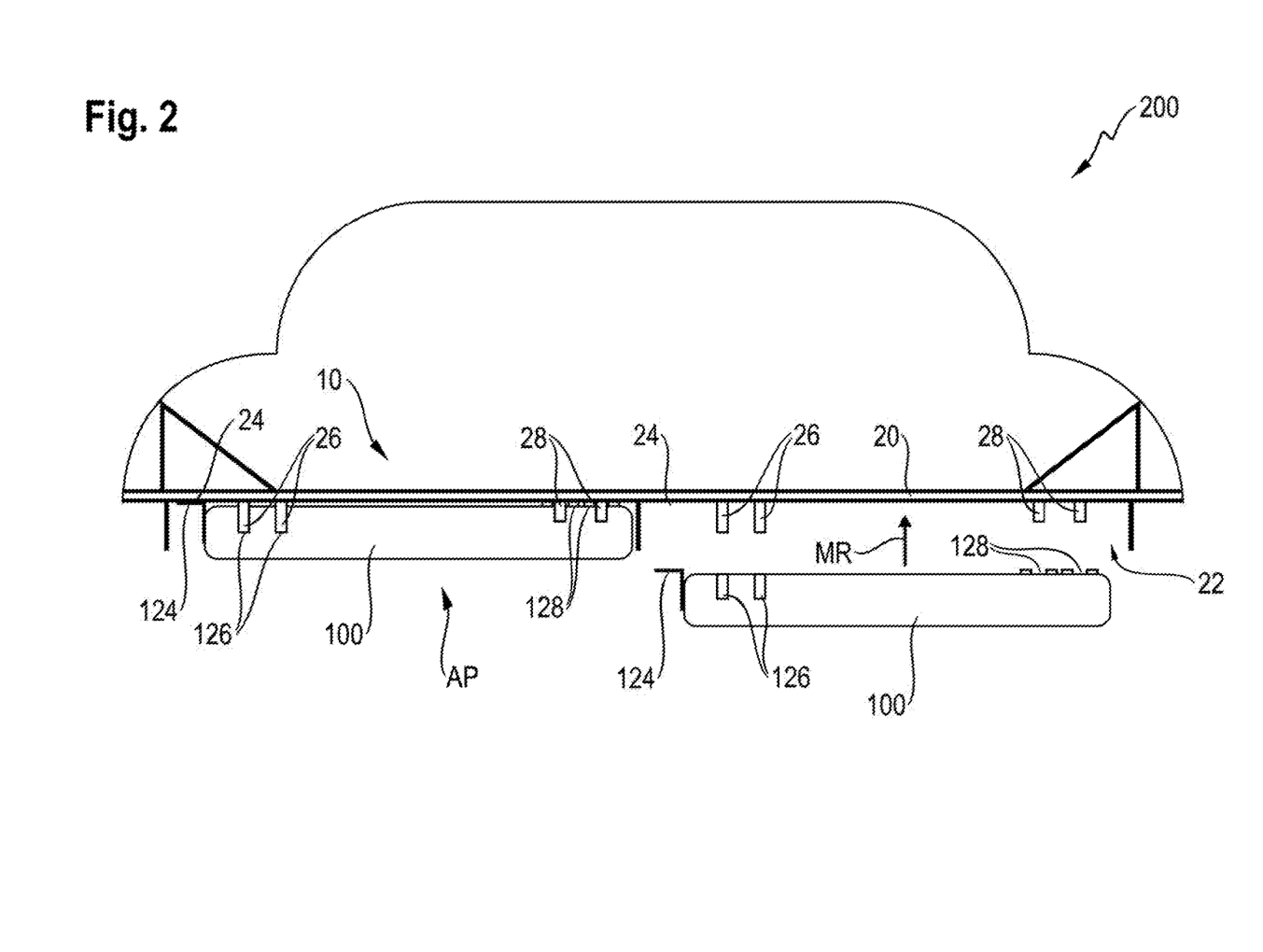
FIG. 2 shows the embodiment of FIG. 1 during mounting.

FIGS. 1 and 2 show a vehicle body 10 for an electrically driven vehicle 200. Here, the vehicle body 10 is equipped with a vehicle frame 20 in order to take up and transmit mechanical forces during the operation of the vehicle 200. In addition, the vehicle frame 20 is, as is shown in FIGS. 1 and 2, equipped with a battery portion 22. It is schematically illustrated here that two separate battery modules 100, which can have a plurality of individual battery cells 130, are intended to be inserted into the battery portion 22.

FIGS. 1 and 2 show how a sequential mounting of the individual battery modules can be effected. For mounting purposes, the battery portion 22 of the vehicle frame 20 is equipped with corresponding contact portions 26, fluid portions 28 and fastening interfaces 24.

It is illustrated in FIG. 1 how, at first, the left-hand battery module 100 is to be inserted upward along a mounting direction MR. The insertion directions ER of the contact portions 26 and of the fluid portions 28 are also formed along mounting direction MR.

On passing to FIG. 2, it can be seen how the battery module 100, now in an inserted and thus received position AP, is arranged in a contacting manner for electrical contacting between the contact portions 26 and the mating contact portions 126. The same applies to the formation of the fluid-communicating connection between the fluid portions 28 and the mating fluid portions 128. In the next step it is then possible in the same way, as the next stage of the sequence, for the right-hand battery module 100 to be moved upward along the mounting direction MR in order to form the fluid-communicating connection here too between the fluid portions 28 and the mating fluid portions 128 and also the electric connection between the contact portions 6 and the mating contact portions 126.

Figure 3:
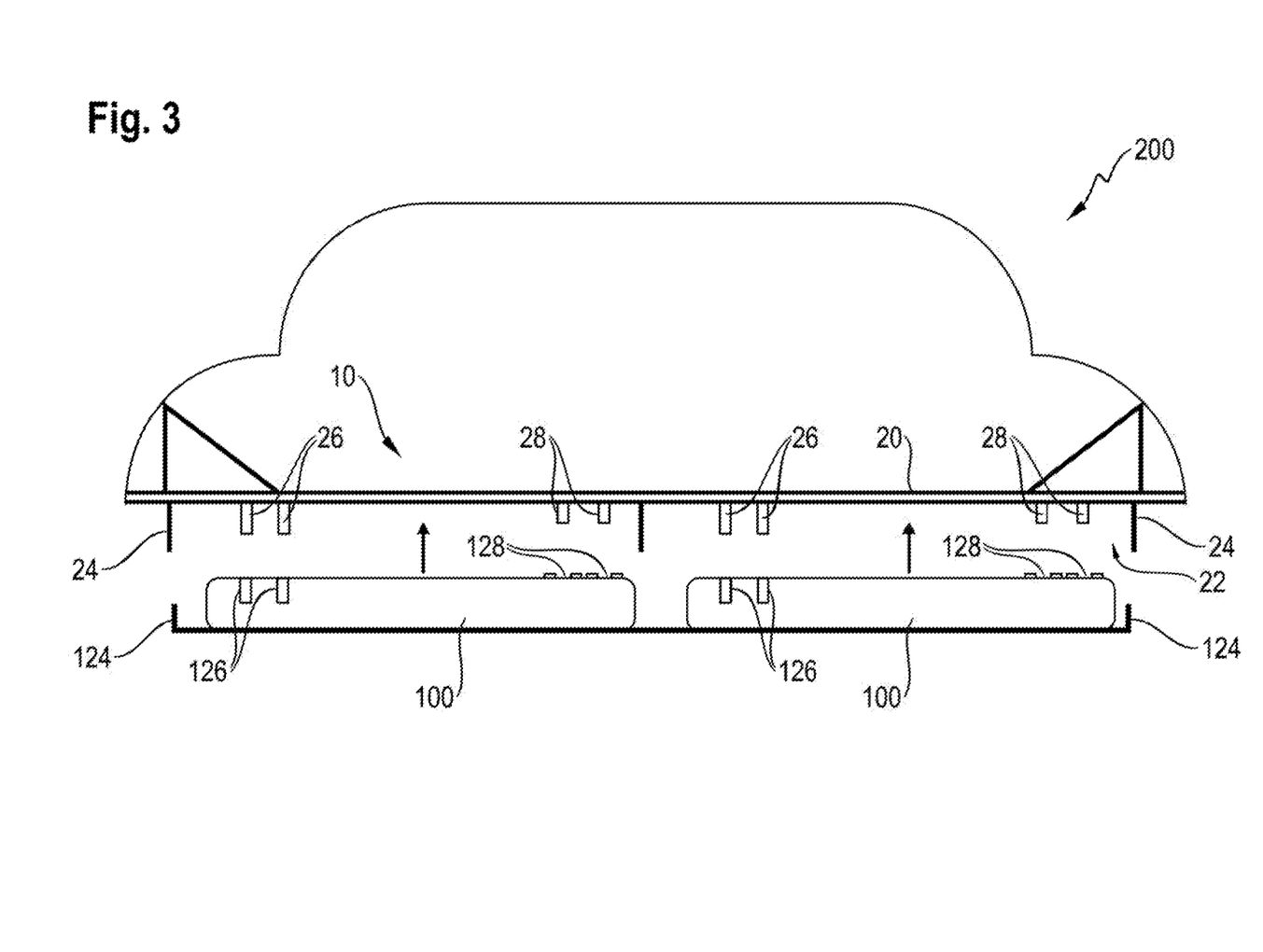
FIG. 3 shows a further embodiment of a vehicle body according to aspects of the invention.
Figure 4:
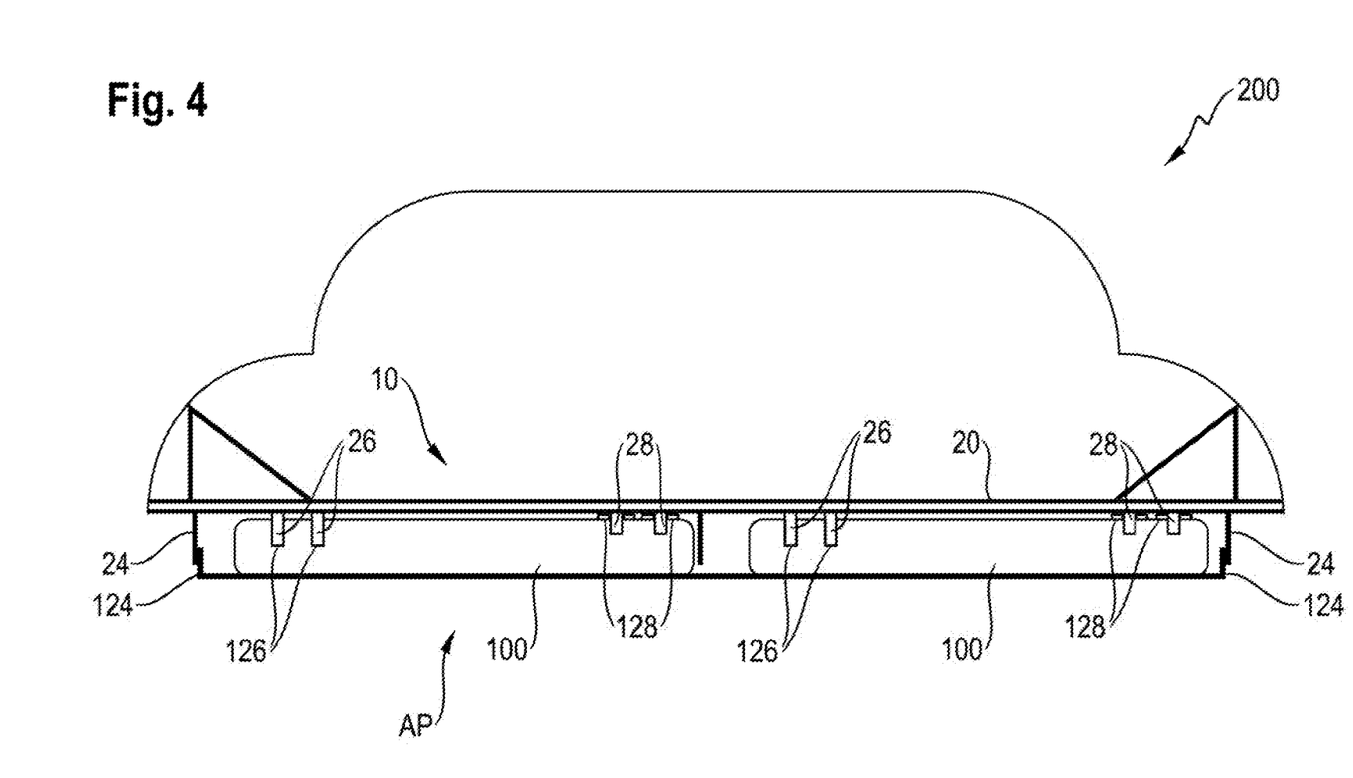
FIG. 4 shows the embodiment of FIG. 3 during mounting.

FIGS. 3 and 4 illustrate how, alternatively or additionally to a sequential mounting, a simultaneous mounting can also be effected. Here, the individual battery modules 100 are arranged on a part of an underbody or subframe, and can thus be moved upward together along the mounting direction MR. The corresponding fastening interface 24 is arranged on the outside of the battery portion 22, with the result that the fastening with the mating fastening interfaces 124 can be carried out in the manner as shown in FIG. 4. The contacting between the contact portions 26 and the fluid portions 28 on the one hand and the mating contact portions 126 and the mating fluid portions 128 on the other hand takes place in an analogous manner to that explained with respect to FIGS. 1 and 2.

Figures 5, 6, 7:
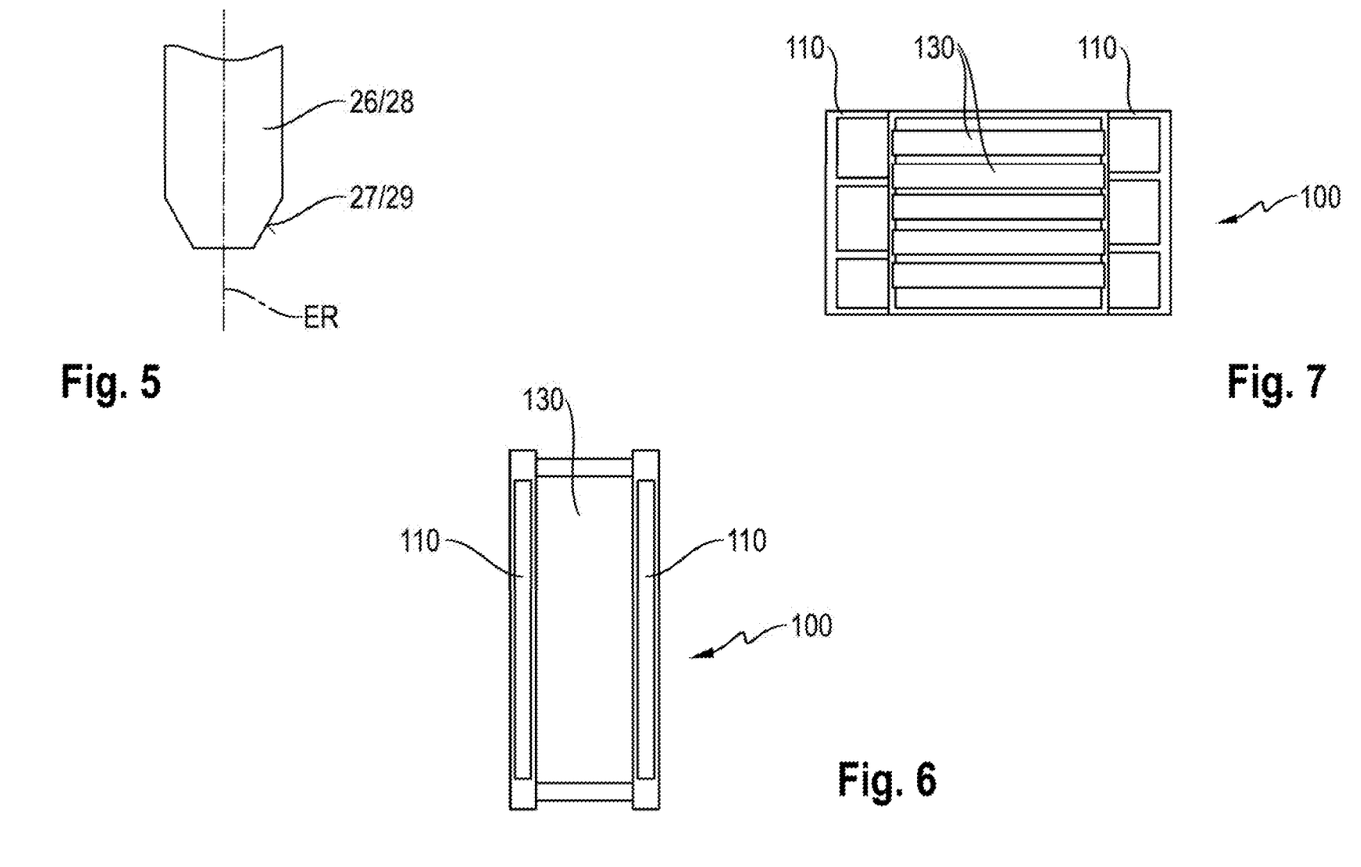
FIG. 5 shows an embodiment of a guide surface for a contact portion or a fluid portion.
FIG. 6 shows an embodiment of a battery module.
FIG. 7 shows the embodiment of FIG. 6 in a schematic illustration.

FIG. 5 shows an embodiment of the contact portions 26 or of the fluid portions 28, which can here have guide surfaces 27 and 29 with a conical design. During the insertion movement along the insertion direction ER in the direction of the received position AP, this allows an alignment to be carried out relative to the battery portion 22, this alignment having to be carried out at least in subregions.

FIGS. 6 and 7 then show that a battery module 100 can be formed from one or more individual battery cells 130. Of course, separate cooling devices are provided here which enclose the respective battery cells 130 from the outside on the two lateral portions of the battery module 100 and can thus make available a cooling functionality for the respective battery module 100. The associated contacting then occurs for the formation of the fluid-communicating communication between the mating fluid portions 128 and the fluid portions 28.

The above explanation of the embodiments describes the present invention exclusively within the context of examples. Individual features of the embodiments can, where technically meaningful, be freely combined with one another without departing from the scope of the present invention.

What is claimed is:

1. A vehicle body for an electrically driven vehicle, having a vehicle frame for transmitting mechanical forces during operation of the vehicle, wherein the vehicle frame has a battery portion for receiving at least two battery modules, and the battery portion of the vehicle frame has (i) a mating surface to which the at least two battery modules are mated in a received position and (ii) at least one fastening interface on the mating surface for fastening the at least two battery modules in the received position,
   wherein the battery portion of the vehicle frame has, for each battery module to be received, two electrical contacts for electrically contacting mating contact portions of the respective battery module in the received position,
   wherein the battery portion of the vehicle frame has, for each battery module to be received, fluid contacts for forming a fluid-communicating connection to a mating fluid portion of the respective battery module in the received position,
   wherein the electrical contacts and the fluid contacts of the vehicle frame are each defined on the mating surface and have the same insertion direction which is oriented substantially along a mounting direction of the respective battery module into the battery portion into the received position,
   wherein the fluid contacts of the battery portion are spaced apart by a distance that is less than a distance separating the fluid contacts from the electrical contacts of the battery portion,
   wherein the fluid contacts of the vehicle frame for engaging with a first battery module of the two battery modules are positioned closer to the electrical contacts of the vehicle frame for engaging with a second battery module of the two battery modules than the electrical contacts of the vehicle frame for engaging with the first battery module.

2. A battery module for use in a vehicle body having the features of claim 1, having a mating fastening interface for fastening to the fastening interface of the battery portion of the vehicle frame.

3. The battery module as claimed in claim 2, further comprising a cooling device oriented laterally on the battery module, wherein the cooling device is configured to be connected to one of the fluid contacts of the vehicle frame.

4. The vehicle body as claimed in claim 1, wherein the electrical contacts have guide surfaces for orienting the respective battery module relative to the battery portion during insertion into the received position.

5. The vehicle body as claimed in claim 1, wherein the fluid contacts have guide surfaces for orienting the respective battery module relative to the battery portion during insertion into the received position.

6. A method for releasably mounting a battery module to a battery compartment in a vehicle frame, comprising the following steps:
   inserting, in an insertion direction, at least two battery modules in the battery compartment,
   mating, in the insertion direction, electrical contacts of each battery module to electrical contacts on a mating surface of the battery compartment of the vehicle frame,
   mating, in the insertion direction, fluid contacts of each battery module to fluid contacts on the mating surface of the battery compartment of the vehicle frame, wherein the fluid contacts of the battery compartment are spaced apart by a distance that is less than a distance separating the fluid contacts of the battery compartment from the electrical contacts of the battery compartment, and wherein the fluid contacts of the vehicle frame for engaging with a first battery module of the two battery modules are positioned closer to the electrical contacts of the vehicle frame for engaging with a second battery module of the two battery modules than the electrical contacts of the vehicle frame for engaging with the first battery module,
   mating, in the insertion direction, the at least two battery modules to the mating surface of the battery compartment of the vehicle frame, and
   fastening the at least two battery modules to fastening interfaces on the mating surface of the battery portion in a received position.

* * * * *